Patented Aug. 17, 1926.

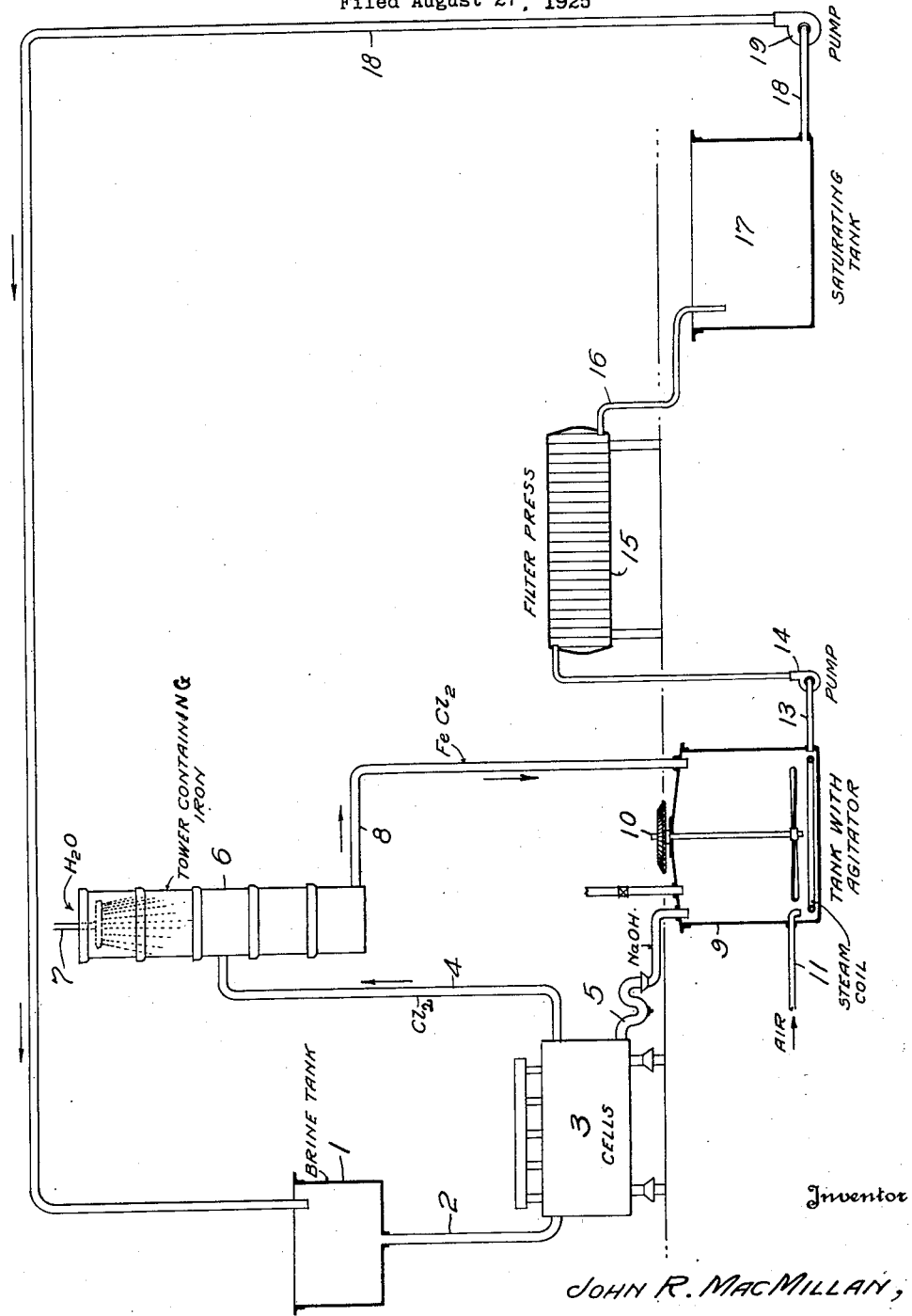

1,596,363

UNITED STATES PATENT OFFICE.

JOHN R. MacMILLAN, OF LA SALLE, NEW YORK, ASSIGNOR, BY MESNE ASSIGNMENTS, TO NIAGARA PIGMENT CORPORATION, OF NIAGARA FALLS, NEW YORK, A CORPORATION OF NEW YORK.

MANUFACTURE OF OXIDE PIGMENTS.

Application filed August 27, 1925. Serial No. 52,959.

This invention relates to the manufacture of oxide pigments; and it comprises a method of producing iron oxide pigments from metallic iron by a simple and self-contained process wherein salt is electrolyzed to produce gaseous chlorin and a solution of caustic soda and common salt, the chlorin being led into contact with metallic iron and water to form a solution of iron chlorids, this solution being contacted with further iron to produce ferrous chlorid, the ferrous chlorid solution precipitated with the liquor from the chlorin cell, precipitation being, if desired, under oxidizing conditions, the precipitate washed, dried and calcined and the mother liquor advantageously returned to the cell for renewed electrolysis; all as more fully hereinafter set forth and as claimed.

The production of iron oxide pigments of good and true colors and of good fineness is a somewhat difficult technical question. In practice, it has been found that iron oxide pigments ($Fe_2O_3$) are most satisfactorily made by oxidation of ferrous oxide (FeO). The natural iron oxide pigments are not of as high quality as those which can be made in this way. High colored pigments can also be made by roasting ferrous salts, but the operation is somewhat inconvenient, because of the necessity of disposing of corrosive gases and vapors. The production of ferrous oxide on any large scale is, however, a somewhat difficult and expensive proposition. It can be made from pickle liquors by precipitation with lime, but the lime compounds must be afterwards removed and this is a matter of some difficulty.

It is the object of the present invention to provide a simple and direct method of producing ferrous oxide and pigments made therefrom directly from metallic iron, which may be scrap iron or any other cheap commercial form of metal. To this end, I electrolyze a salt solution in the ordinary type of soda and chlorin cell, producing gaseous chlorin and a cell liquor containing caustic soda with an excess of salt. The caustic soda in the cell liquor and the chlorin gas produced are of course equivalent chemically in amount. The chlorin is led into the middle of a tower containing scrap iron over which is trickling a current of water or brine (salt water). The chlorin is at once taken up by the iron, producing a solution of ferrous and ferric chlorid. As the solution passes downward beyond the point of chlorin introduction, the ferric chlorid is converted into ferrous chlorid by the iron. At the base of the tower emerges a solution of ferrous chlorid containing all the chlorin coming from the cell. This solution of ferrous chlorid is mixed with cell liquor containing caustic soda, whereupon there is a reformation of common salt in solution and a precipitation of ferrous oxide in a hydrated stage. If it is desired to oxidize the ferrous oxide partially or completely at this stage, it may be done by aeration. The precipitate is very pure, since the solution contains nothing but salt and is readily washed out. In practice, I pump the magma from the precipitating tank to a filter press where the precipitate is separated and washed. The press liquor is returned to the cell for use anew. A little replenishing salt may be added to it to make up for losses in washing the press cake. The press cake is washed, dried and calcined to make oxide red. The hue of the product obtained depends upon the temperature and oxidizing conditions prevailing, and also upon circumstances during the precipitation. However made, the product is bright and true-colored and is of impalpable fineness, making it suitable for use, not only as a pigment, but as a filler for rubber and many other purposes.

In the accompanying illustration, I have shown in a diagrammatic way an installation suitable for use in the performance of the described process, this showing being in the nature of a flow sheet with the various elements bearing legends. Valves and accessory parts have not been shown. In the showing—

Element 1 is a stock tank for brine, delivering brine through pipe 2 to electrolytic cells 3 which may be of any of the usual types employed for electrolyzing salt solution to give chlorin and caustic soda solutions. Gaseous chlorin leaves the cells through pipe 4 and cell liquor containing caustic soda and the excess of salt leaves through trapped line 5. The chlorin gas is led to a tower 6, which it enters at a midpoint. The tower is kept charged with metallic iron, which may be scrap iron, pig iron or any other suitable cheap form of metallic iron. Down through the tower trickles water or brine, entering through rose 7. In the presence of the water and the iron, the chlorin is taken up completely, no chlorin escaping at the top of the tower. The chlorin is taken up as ferric and ferrous chlorids in varying proportions; the down passing water being converted into a solution of the salts. After the solution passes the point of chlorin introduction, the ferric chlorid is converted into ferrous chlorid at the expense of the iron below the chlorin entry. At the base of the tower a solution of the ferrous chlorin emerges and passes away through pipe 8 and is delivered to precipitating tank 9 into which is also fed cell liquor coming through pipe 5. Tank 9 is provided with stirring means 10, air introducing means 11 and heating coils 12. In the tank, the caustic soda reacts with the ferrous chlorid by a well understood reaction to give a gray-green precipitate of ferrous hydroxide; common salt being re-formed. There is no excess of soda or of ferrous chlorid; the amounts of the two exactly balance. The result is a precipitate of pure ferrous hydrate and a solution of common salt; the former separating in clean, easily handled form. If it be desired to oxidize this ferrous hydrate in whole or in part to ferric hydrate at any desired temperature, this may be done by manipulation of air from inlet 11 and of heat in the steam coils in the tank 9. The magma of salt solution and of iron oxide or oxides in hydrated form is drawn from the bottom of the precipitator continuously or from time to time by pipe 13 and pump 14 and sent to filter press 15, where the ferrous hydrate is separated from the mother liquor. This mother liquor is a pure salt solution suitable for re-use. It leaves the filter press through outlet pipe 16, going to stock tank 17, together with such washings as may come from the process. In this stock tank it may be brought back to the proper density for use in the cells by an addition of salt. A solution of salt of standard density is taken from the tank by pipe 18 and pump 19 and returned to the original stock tank 1 for re-use in the process. Sometimes, no particular washing is resorted to in the process; some of the mother liquor being left in the press cake. In this event, water as well as salt will have to be added in the replenishing stock tank 17. The press cake from the filter press is delivered to an oxidizing furnace (not shown) of any ordinary type, where it is roasted to give pigments of any of the desired iron colors. After roasting, any residual salt in the material may be readily washed out and regained.

What I claim is:—

1. The process of making iron oxide pigments which comprises electrolyzing salt solution, passing the evolved chlorin into contact with water and iron under circumstances giving a ferrous chlorid solution, precipitating the ferrous chlorid solution with liquor from the cells containing caustic soda, separating the precipitate from the mother liquid, oxidizing the precipitate and returning the mother liquor for renewed electrolysis.

2. The process of making iron oxide pigments which comprises electrolyzing salt solution, passing the evolved chlorin into contact with brine and iron under circumstances giving a ferrous chlorid solution, precipitating the ferrous chlorid solution with liquor from the cells containing caustic soda, separating the precipitate from the mother liquor, oxidizing the precipitate and returning the mother liquor for renewed electrolysis.

3. In the production of iron oxide pigments, the process which comprises electrolyzing a common salt solution to make chlorin and caustic soda, passing the chlorin into a middle point in a tower containing metallic iron and having water trickling therethrough, removing the resultant solution of ferrous chlorid, precipitating the solution with cell liquor containing caustic soda, oxidizing the precipitate to make iron oxide pigments and returning the mother liquor for renewed electrolysis.

4. In the production of iron oxide pigments, the process which comprises electrolyzing a common salt solution to make chlorin and caustic soda, passing the chlorin into a middle point in a tower containing metallic iron and having brine trickling therethrough, removing the resultant solution of ferrous chlorid, precipitating the solution with cell liquor containing caustic soda, oxidizing the precipitate to make iron oxide pigments and returning the mother liquor for renewed electrolysis.

5. The process of making iron oxide pigments which comprises electrolyzing salt solution, passing the evolved chlorin into contact with water and iron under circumstances giving a ferrous chlorid solution, precipitating the ferrous chlorid solution with liquor from the cells containing caustic soda, separating the precipitate from the mother liquor and oxidizing the precipitate.

6. In the production of iron oxide pigments, the process which comprises electrolyzing a common salt solution to make chlorin and caustic soda, passing the chlorin into a middle point in a tower containing metallic iron and having water trickling therethrough, removing the resultant solution of ferrous chlorid, precipitating the solution with cell liquor containing caustic soda and oxidizing the precipitate to make iron oxide pigments.

In testimony whereof, I have hereunto affixed my signature.

JOHN R. MacMILLAN.